(12) United States Patent
Matsumoto (10) Patent No.: US 8,526,127 B2
(45) Date of Patent: Sep. 3, 2013

(54) LENS BARREL ASSEMBLY HAVING IRIS DIAPHRAGM DEVICE AND PROJECTOR

(75) Inventor: Satoru Matsumoto, Saitama (JP)

(73) Assignee: FujiFilm Corporation, Tokyo (JP)

( * ) Notice: Subject to any disclaimer, the term of this patent is extended or adjusted under 35 U.S.C. 154(b) by 366 days.

(21) Appl. No.: 13/073,508

(22) Filed: Mar. 28, 2011

(65) Prior Publication Data

US 2011/0235001 A1    Sep. 29, 2011

(30) Foreign Application Priority Data

Mar. 29, 2010  (JP) .................. 2010-075353
Mar. 17, 2011  (JP) .................. 2011-059563

(51) Int. Cl.
  *G02B 9/00*  (2006.01)
  *G02B 15/14*  (2006.01)
  *G03B 9/02*  (2006.01)

(52) U.S. Cl.
  USPC .......... 359/740; 359/699; 359/700; 359/701; 396/63; 396/235; 396/505; 396/510

(58) Field of Classification Search
  USPC ............... 359/694, 695, 699–701, 704, 705, 359/740; 396/63, 72–75, 79, 89, 144, 235, 396/505, 508, 510, 529; 353/97
  See application file for complete search history.

(56) References Cited

U.S. PATENT DOCUMENTS

| | | | | |
|---|---|---|---|---|
| 4,623,227 A | * | 11/1986 | Kamata | 359/705 |
| 5,079,575 A | * | 1/1992 | Nii et al. | 396/63 |
| 5,592,335 A | * | 1/1997 | Omi et al. | 359/695 |
| 6,995,926 B2 | * | 2/2006 | Hayashi | 359/694 |

FOREIGN PATENT DOCUMENTS

| | | |
|---|---|---|
| JP | 06-265972 | 9/1994 |
| JP | 2001-290190 | 10/2001 |

* cited by examiner

*Primary Examiner* — Loha Ben
(74) *Attorney, Agent, or Firm* — Young & Thompson (57) ABSTRACT

A lens barrel assembly has a first groove formed in a stationary barrel. A second groove is formed in a rotatable barrel. A diaphragm control plate portion is disposed between an inner surface of the rotatable barrel and an iris diaphragm device in a rotatable manner in a circumferential direction, has an end portion connected to a driving ring. An engaging groove is formed in the diaphragm control plate portion to extend along the optical axis. An operable aperture ring is disposed outside the stationary barrel. A pin device has first and second end portions, the first end portion being secured fixedly to the aperture ring, the second end portion being inserted through the first and second grooves and the engaging groove, for operating upon rotation of the aperture ring to cause the engaging groove to rotate the diaphragm control plate portion to actuate the driving ring.

14 Claims, 8 Drawing Sheets

LENS BARREL ASSEMBLY HAVING IRIS DIAPHRAGM DEVICE AND PROJECTOR

BACKGROUND OF THE INVENTION

1. Field of the Invention

The present invention relates to a lens barrel assembly having an iris diaphragm device, and a projector. More particularly, the present invention relates to a lens barrel assembly having an iris diaphragm device, and a projector, in which rotation of a part can be reliably transmitted to a part included in the iris diaphragm device.

2. Description Related to the Prior Art

A lens barrel assembly for use with a projector is known, and operated for enlarging image light to project an image to a screen. The lens barrel assembly includes a stationary barrel, a rotatable barrel and an iris diaphragm device. There are linear grooves formed in the stationary barrel. There are cam grooves formed in the rotatable barrel. Lenses/lens groups in the rotatable barrel are moved in a direction along an optical axis according to the linear groove of the stationary barrel for zooming. The iris diaphragm device is disposed at a rear end of the stationary barrel or between lenses/lens groups, and adjusts brightness of an image projected to the screen.

JP-A 6-265972 discloses the iris diaphragm device, which includes a support ring, a driving ring and plural diaphragm blades disposed between the support ring and the driving ring. The diaphragm blades are pivotally movable on the support ring. A cam slot guides the diaphragm blades on the driving ring. When the driving ring is rotated, the diaphragm blades are moved pivotally, so that an aperture opening can be enlarged or reduced.

Various types of structures for changing the aperture opening of the iris diaphragm device are known. See JP-A 2001-290190. A first one of those is a manual type in which an operable aperture ring is disposed around the lens barrel assembly. A diaphragm control plate portion or lever is caused by rotation of the aperture ring operated manually or mechanically to rotate the driving ring. A second one of the types is a motor drive type in which a small motor is incorporated in the lens barrel assembly. The motor is driven to rotate the driving ring.

In the manual type, it is necessary between the aperture ring and the driving ring to dispose the diaphragm control plate portion in a manner offset from the rotatable barrel. Thus, the diaphragm control plate portion has a long shape in a direction along the optical axis. A guide device is used for guiding the diaphragm control plate portion in a manner rotatable about the optical axis of the stationary barrel without play. However, there occurs a problem in that a cumulative error of the diaphragm control plate portion with the guide device may be created according to errors of parts and/or errors of assembly. It is likely that the diaphragm control plate portion becomes offset rotationally about the driving ring by rotation of the aperture ring because of the long shape in the direction along the optical axis. Failure of transmitting rotation of the aperture ring to the driving ring will occur seriously.

Also, a problem arises in the motor drive type in that reduction of a size of the lens barrel assembly is far more difficult than that of the manual type. A manufacturing cost of the motor drive type is considerably high.

SUMMARY OF THE INVENTION

In view of the foregoing problems, an object of the present invention is to provide a lens barrel assembly having an iris diaphragm device, and a projector, in which rotation of a part can be reliably transmitted to a part included in the iris diaphragm device.

In order to achieve the above and other objects and advantages of this invention, a lens barrel assembly includes a stationary barrel, a rotatable barrel for rotating in the stationary barrel relative thereto, to move an incorporated lens system along an optical axis, and an iris diaphragm device, contained in the rotatable barrel, for changing a size of an aperture opening by rotating a driving portion rotatable about the optical axis. The lens barrel assembly includes a first groove, formed in the stationary barrel to extend in a circumferential direction defined about the optical axis, and having a length equal to or more than a rotatable range of the rotatable barrel. A second groove is formed in the rotatable barrel to extend along the first groove, and has a length according to a combination of the rotatable range of the rotatable barrel and a rotatable range of the driving portion. A diaphragm control plate portion is disposed in the rotatable barrel in a rotatable manner in the circumferential direction, has an end portion from which the driving portion extends. An engaging groove is formed in the diaphragm control plate portion to extend along the optical axis. An operable unit is disposed outside the stationary barrel in a rotatable manner about the optical axis. A pin device has first and second end portions, the first end portion being secured fixedly to the operable unit, the second end portion being inserted through the first and second grooves and the engaging groove, for operating upon rotation of the operable unit to cause the engaging groove to rotate the diaphragm control plate portion about the optical axis to actuate the iris diaphragm device with the driving portion.

The length of the second groove is equal to or more than a sum of the rotatable range of the rotatable barrel and the rotatable range of the driving portion.

The first groove is constituted by at least first and second insertion grooves formed in positions respectively defined by equally dividing a circumference of the stationary barrel in the circumferential direction, and the first insertion groove receives insertion of the pin device. Furthermore, a second operable unit is disposed outside the stationary barrel, for rotating the rotatable barrel. A transmission portion is inserted in the second insertion groove, for transmitting force from the second operable unit to the rotatable barrel.

The pin device is a quadrilateral cross-section pin device.

The diaphragm control plate portion is formed together with the driving portion.

In a preferred embodiment, furthermore, a retaining portion secures the end portion of the diaphragm control plate portion to the driving portion.

The lens system is for use with a projector.

Furthermore, a lens holder is contained in the rotatable barrel, for supporting the lens system. A cam mechanism moves the lens holder along the optical axis when the rotatable barrel is rotated.

The iris diaphragm device further includes a plurality of diaphragm blades, moved pivotally when the driving portion is rotated, for enlarging and reducing the aperture opening.

The lens system includes at least first, second and third lens optics arranged on the optical axis serially. The iris diaphragm device is associated with a lens holder of the second lens optics.

Also, a projector for projecting an image is provided, including a stationary barrel, a rotatable barrel for rotating in the stationary barrel relative thereto, to move an incorporated lens system along an optical axis, and an iris diaphragm device, contained in the rotatable barrel, for changing a size of an aperture opening by rotating a driving portion rotatable about the optical axis. The projector includes a first groove, formed in the stationary barrel to extend in a circumferential direction defined about the optical axis, and having a length equal to or more than a rotatable range of the rotatable barrel. A second groove is formed in the rotatable barrel to extend along the first groove. A diaphragm control plate portion is disposed in the rotatable barrel in a rotatable manner in the circumferential direction, has an end portion from which the driving portion extends. An engaging groove is formed in the diaphragm control plate portion to extend along the optical axis. An operable unit is disposed outside the stationary barrel in a rotatable manner about the optical axis. A pin device has first and second end portions, the first end portion being secured fixedly to the operable unit, the second end portion being inserted through the first and second grooves and the engaging groove, for operating upon rotation of the operable unit to cause the engaging groove to rotate the diaphragm control plate portion about the optical axis to actuate the iris diaphragm device with the driving portion.

Therefore, rotation of the operable unit can be reliably transmitted to the driving portion included in the iris diaphragm device because of the pin device for transmission through the grooves.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
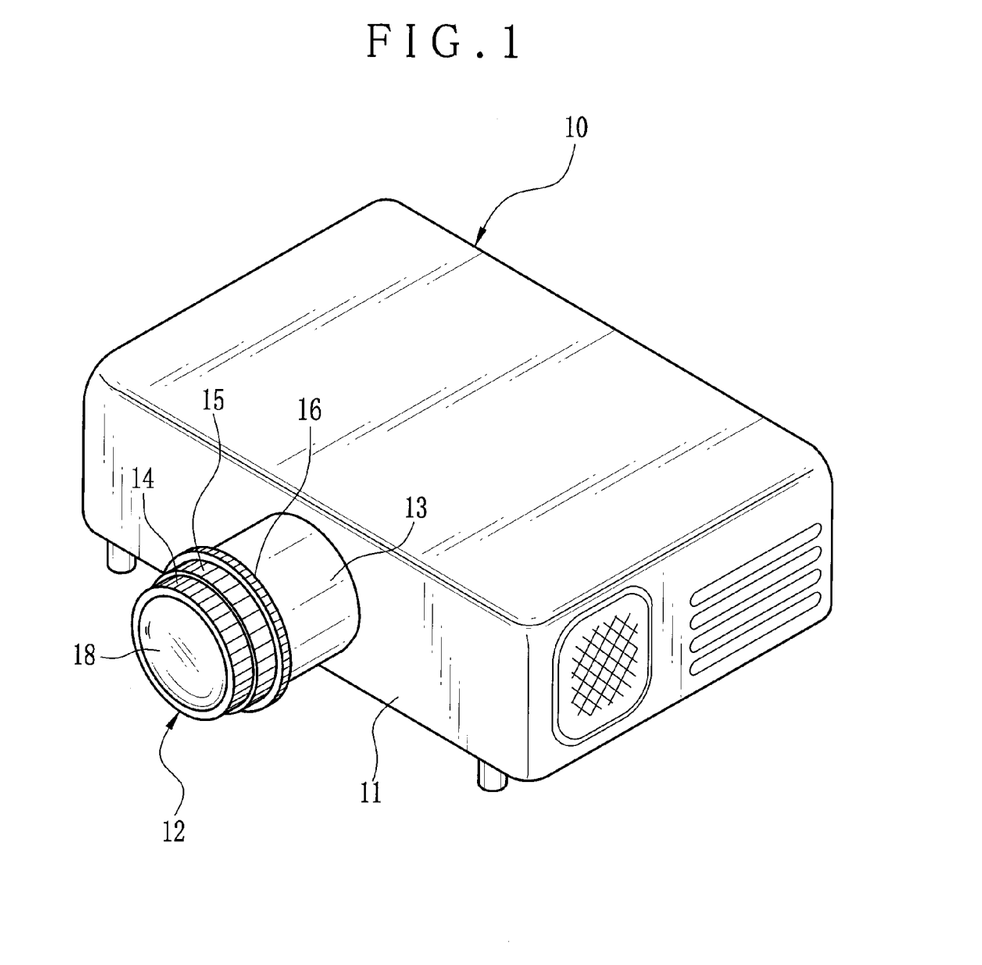
FIG. 1 is a perspective view illustrating a projector.

In FIG. 1, an image projector or video projector 10 includes a projector housing 11 and a lens barrel assembly 12 or projection lens assembly of the invention. A stationary barrel 13 is cylindrical in the lens barrel assembly 12. Plural rings are disposed around the stationary barrel 13, and include a focus ring 14, a zoom ring 15 and a manually operable aperture ring 16 or operable unit in an order in a backward direction. The focus ring 14 is rotated for focusing. The zoom ring 15 is rotated for zooming. The aperture ring 16 is rotated for changing an aperture opening of an iris diaphragm device. There are knurling teeth on surfaces of the focus ring 14, the zoom ring 15 and the aperture ring 16 to facilitate a contact of fingers for manually rotating those.

The projector housing 11 contains a light source, a liquid crystal display device of a transmission type, and a cross dichroic prism. The light source emits white light. The liquid crystal display device corresponds to three primary colors of red, green and blue. The white light from the light source is separated into components of the three primary colors, which are incident upon the liquid crystal display device as image light components of the primary colors. The image light components are combined by the cross dichroic prism, and then become incident upon the lens barrel assembly 12. The lens barrel assembly 12 enlarges an image of the image light and projects the image light toward a screen.

Figure 2:
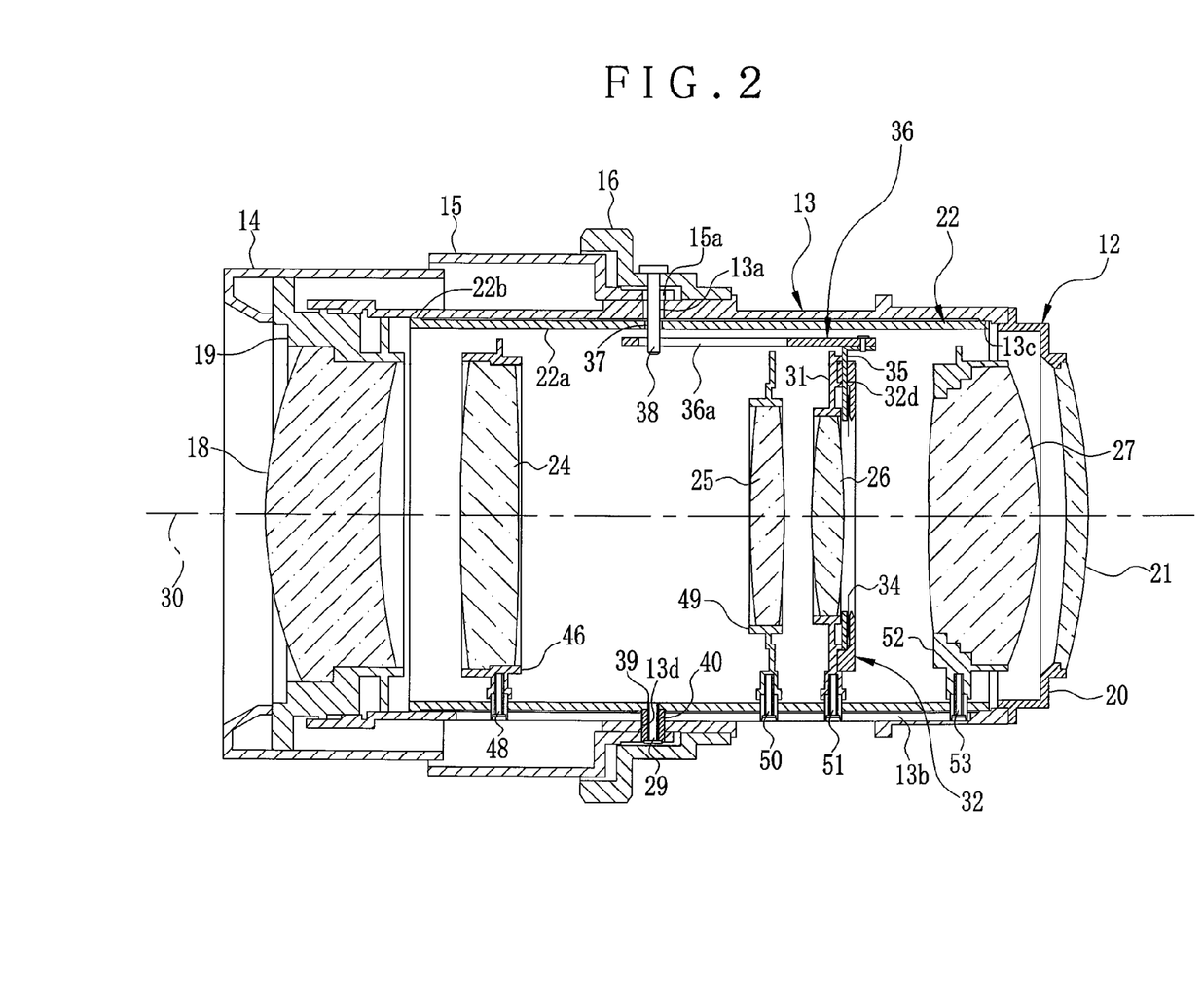
FIG. 2 is a vertical section illustrating a lens system set at a wide-angle end.

In FIG. 2, the lens barrel assembly 12 is a front focus lens as a type of lens system, and includes a focus lens/lens group 18 and a rear lens/lens group 21. At a front end of the stationary barrel 13, a focus barrel 19 is positioned, and includes the focus lens/lens group 18. At a rear end of the stationary barrel 13, a stationary lens holder 20 supports the rear lens/lens group 21. A cam barrel or rotatable barrel 22 is disposed inside the stationary barrel 13 between the focus lens/lens group 18 and the rear lens/lens group 21, and rotatable along the inner surface of the stationary barrel 13. Lens optics 24, 25, 26 and 27 are incorporated in the rotatable barrel 22. A screw 29 connects the zoom ring 15 to the rotatable barrel 22 by helical engagement.

When the focus ring 14 is rotated manually, the focus barrel 19 helically engaged with the stationary barrel 13 is rotated. Along an optical axis 30, the focus lens/lens group 18 is moved to focus the lens system. When the zoom ring 15 is rotated manually, each of the lens optics 24-27 moves along the optical axis 30 for zooming.

Figure 3:
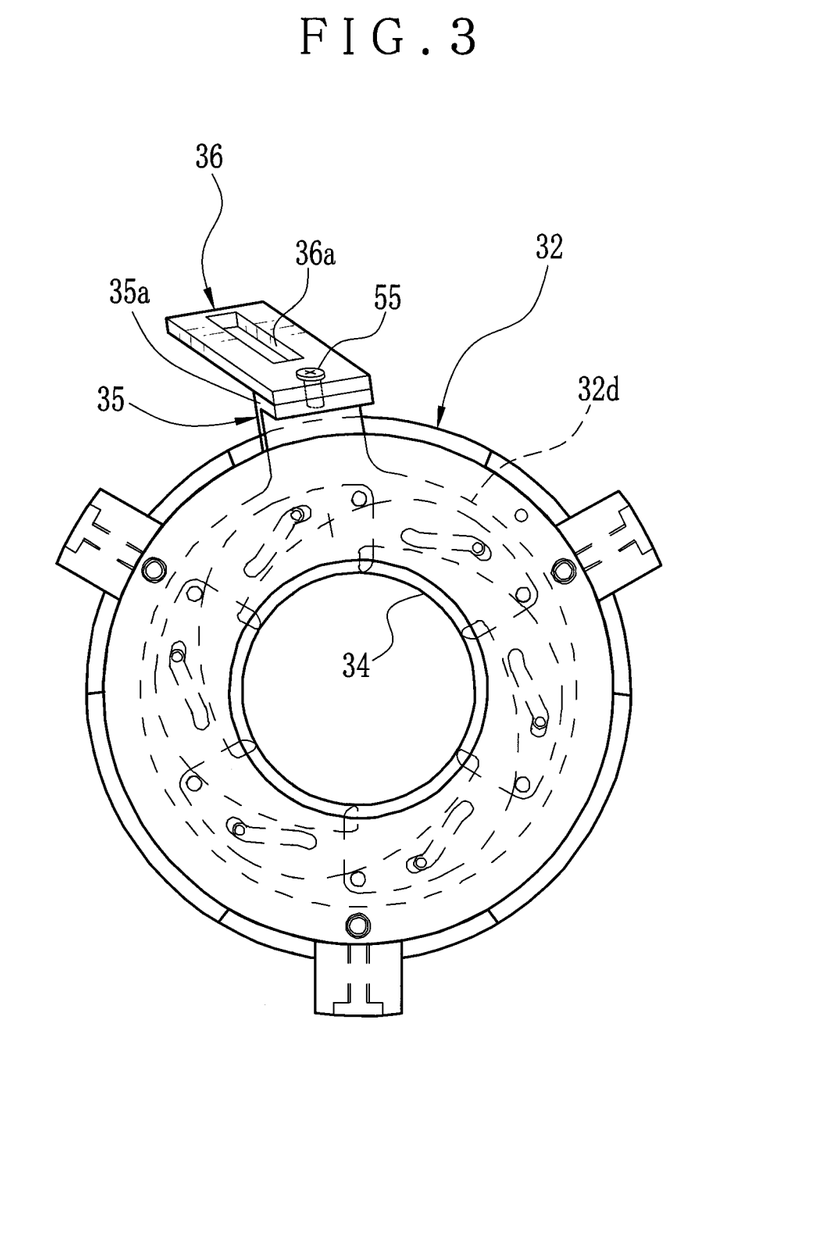
FIG. 3 is a perspective view illustrating an iris diaphragm device.
Figure 4:
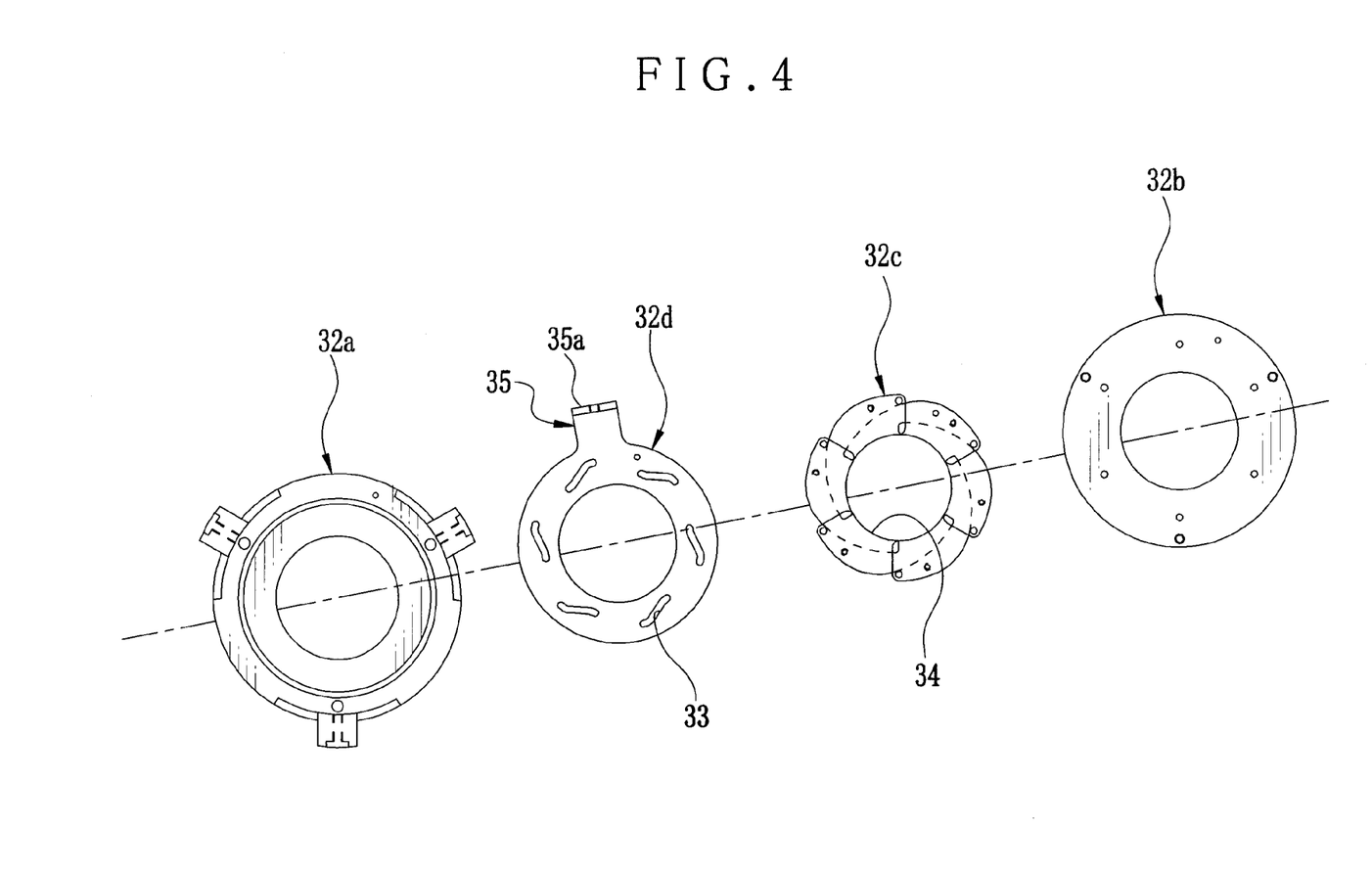
FIG. 4 is an explantory view in a plan, illustrating the iris diaphragm device.

A lens holder 31 supports the lens optics 26. An iris diaphragm device 32 or variable aperture stop device is secured to the lens holder 31, and adjusts brightness of an image to be projected to a screen by adjusting a light amount. In FIGS. 3 and 4, the iris diaphragm device 32 includes a support ring 32a, an aperture plate 32b, a plurality of diaphragm blades 32c, and a rotatable driving ring 32d as a driving portion. The diaphragm blades 32c and the driving ring 32d are retained together between the support ring 32a and the aperture plate 32b. The diaphragm blades 32c are secured to the aperture plate 32b in a pivotally movable manner. Cam slots 33 guide the diaphragm blades 32c on the driving ring 32d in cooperation with cam pins. When the driving ring 32d is rotated about the optical axis, an aperture opening 34 is enlarged or reduced by swing of the diaphragm blades 32c with the cam slots 33.

Note that the support ring 32a may be formed together with the lens holder 31.

A projecting lug 35 is formed on an outer edge of the driving ring 32d to project. An end portion 35a of the projecting lug 35 is a portion bent at a right angle. A diaphragm control plate portion 36 or lever is disposed between the rotatable barrel 22 and the lens holder 31, and has a first end secured by a screw 55 (retaining portion) to the end portion 35a. The diaphragm control plate portion 36 is long in the optical axis direction. An engaging groove 36a is formed in the diaphragm control plate portion 36 near to its second end, and extends in the parallel with the optical axis direction.

Figure 5:
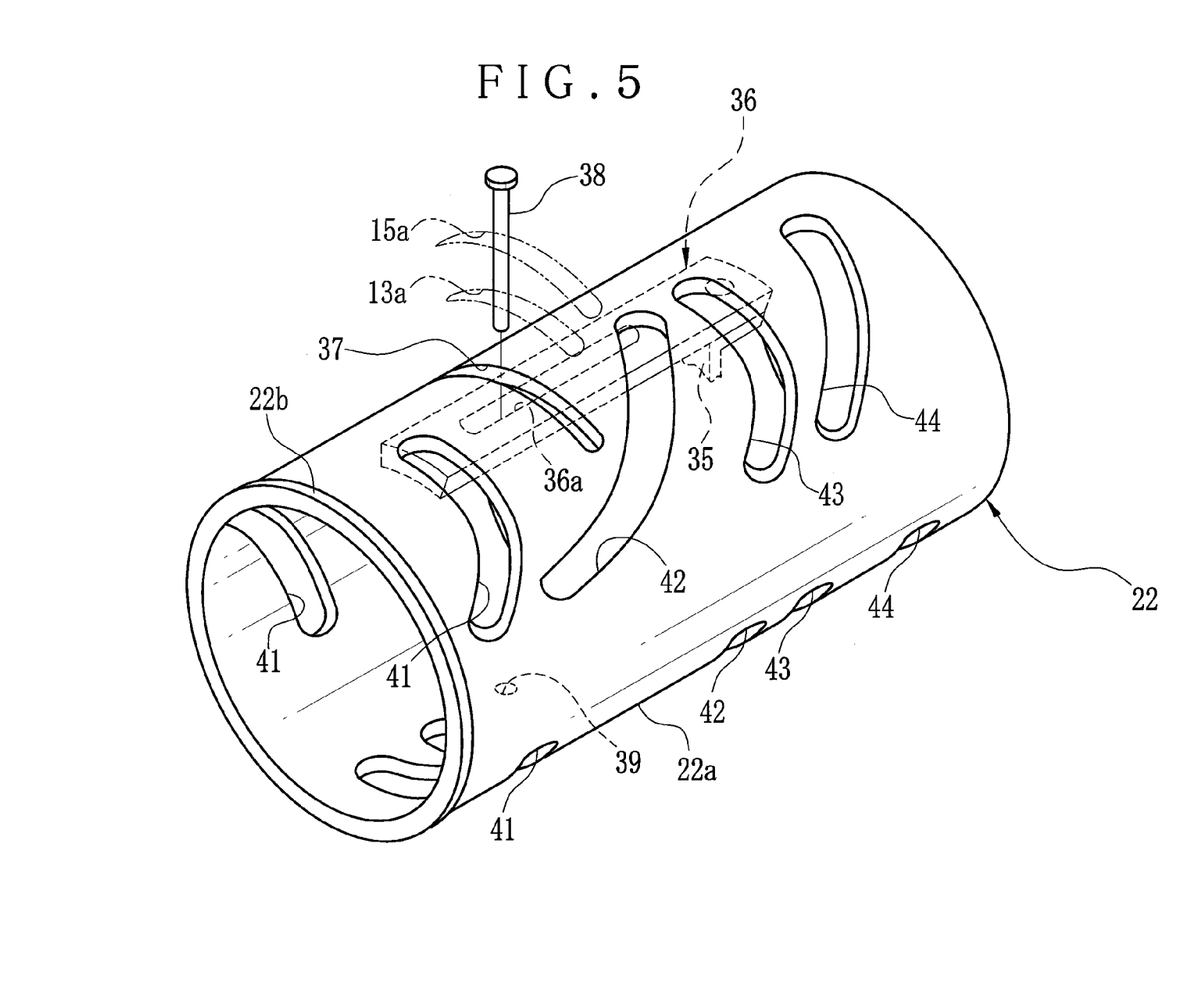
FIG. 5 is a perspective view illustrating a relationship between a rotatable barrel and a diaphragm control plate portion.

In FIG. 5, a first groove 13a is formed in the stationary barrel 13. A barrel housing 22a is a main portion of the rotatable barrel 22. A second groove 37 is formed in the barrel housing 22a, and extends perpendicularly to the engaging groove 36a. The second groove 37 has a larger length than the first groove 13a. A ring groove 15a is formed in the zoom ring 15 which is disposed outside the stationary barrel 13, and has a length equal to the second groove 37. The length of the second groove 37 is equal to or more than a sum of rotatable ranges of the rotatable barrel 22 and the driving ring 32d. In other words, the lengths of the ring groove 15a, the first groove 13a and the second groove 37 are predetermined so that the aperture opening 34 can be enlarged or reduced in both of the telephoto end and the wide-angle end of the lens barrel assembly 12, and that the lens barrel assembly 12 can be zoomed suitably between the telephoto and wide-angle ends in both of a full-open state of fully opening the aperture opening 34 and a minimum open state of minimizing the size of the aperture opening 34. A pin device 38 includes a pin head and a pin portion. The pin head is fixedly secured to the aperture ring 16. The pin portion is inserted in the ring groove 15a, the first groove 13a, the second groove 37 and the engaging groove 36a. A screw hole 39 is formed in the barrel housing 22a for helical engagement with the screw 29.

The screw hole 39 is disposed in a rotationally symmetric manner at 180 degrees from the middle of the second groove 37 with reference to the optical axis 30 of the rotatable barrel 22. An insertion groove 13d has the same shape as the first groove 13a for receiving the pin device 38, and is disposed in a rotationally symmetric manner at 180 degrees with reference to the optical axis 30. The screw 29 as transmission portion is inserted in the insertion groove 13d. There is a spacer sleeve 40 or pipe through which the screw 29 is inserted. As the screw 29 is set in the insertion groove 13d together with the spacer sleeve 40, looseness between the screw 29 and the insertion groove 13d is suppressed even upon rotation of the zoom ring 15.

In the embodiment, the insertion groove 13d is single for receiving the screw 29 to transmit rotation of the zoom ring 15 (second operable unit) to the rotatable barrel 22. However, a plurality of the insertion grooves 13d can be formed in the stationary barrel 13. The entire circumference of the stationary barrel 13 is equally divided by N (integer not less than 2), for example 3, so that the insertion grooves 13d are disposed in N positions defined by the division. A first one of the insertion grooves 13d receives the pin device 38. At least one of those different from the first receives insertion of the screw 29. Note that the integer N is not limited to two or three, but can be four or more.

When the aperture ring 16 is rotated, the pin device 38 moves along the first and second grooves 13a and 37 and the ring groove 15a in a circumferential direction of the stationary barrel 13. The diaphragm control plate portion 36 moves rotationally on the inner surface of the rotatable barrel 22 to rotate the driving ring 32d. Thus, the diaphragm blades 32c of the iris diaphragm device 32 move pivotally to enlarge or reduce a diameter of the aperture opening 34.

Cam grooves 41, 42, 43 and 44 are formed in the barrel housing 22a of the rotatable barrel 22, and extend in inclined directions. The cam grooves 41 are three grooves arranged about the optical axis 30 at an angular pitch of 120 degrees. The cam grooves 42, 43 and 44 are formed in this manner. A lens holder 46 supports the lens optics 24. Three cam followers 48 are formed with an edge of the lens holder 46, and inserted in the cam grooves 41. A lens holder 49 supports the lens optics 25. Three cam followers 50 are formed with an edge of the lens holder 49, and inserted in the cam grooves 42. The lens holder 31 supports the lens optics 26. Three cam followers 51 are formed with an edge of the lens holder 31, and inserted in the cam grooves 43. A lens holder 52 supports the lens optics 27. Three cam followers 53 are formed with an edge of the lens holder 52, and inserted in the cam grooves 44.

Rotation of the zoom ring 15 causes the rotatable barrel 22 rotates. The cam surfaces of the cam grooves 41 push the cam followers 48. The cam surfaces of the cam grooves 42 push the cam followers 50. The cam surfaces of the cam grooves 43 push the cam followers 51. The cam surfaces of the cam grooves 44 push the cam followers 53. In FIG. 2, linear grooves 13b are formed in the inner surface of the stationary barrel 13, and keep the cam followers 48, 50, 51 and 53 from moving rotationally. Thus, the lens optics 24 move along the optical axis together with the cam followers 48 and the lens holder 46. The lens optics 25 move along the optical axis together with the cam followers 50 and the lens holder 49. The lens optics 26 move along the optical axis together with the cam followers 51 and the lens holder 31. The lens optics 27 move along the optical axis together with the cam followers 53 and the lens holder 52.

Figure 6:
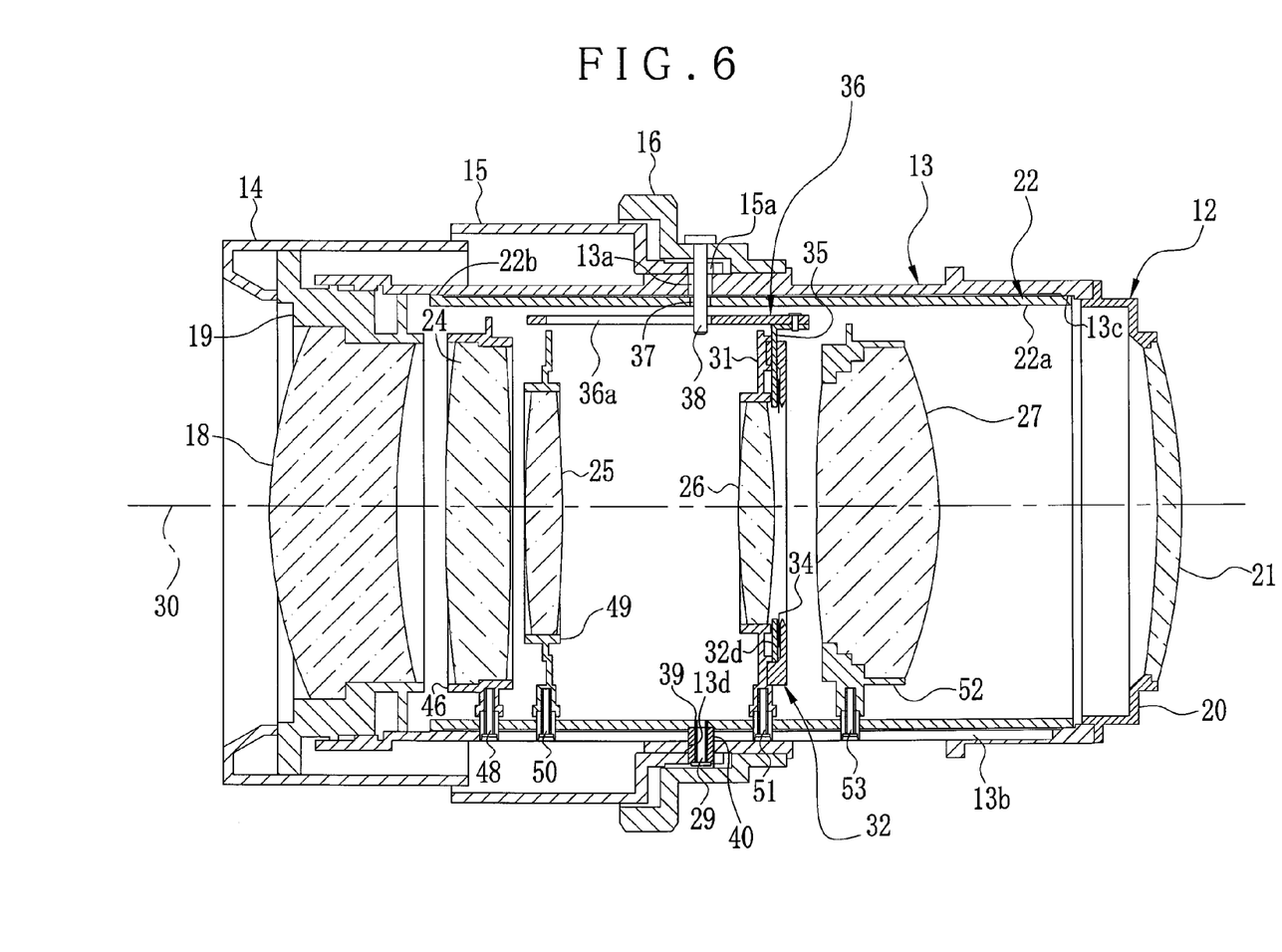
FIG. 6 is a vertical section illustrating the lens system set at a telephoto end.

When the zoom ring 15 is rotated, the lens optics 24-27 are moved along the optical axis between a wide-angle end position of FIG. 2 and a telephoto end position of FIG. 6. The diaphragm control plate portion 36 is caused by movement of the lens optics 26 to move along the optical axis. The aperture opening 34 can be changed in a full zoom range, because a length of the engaging groove 36a in the direction along the optical axis is determined according to a movable range of the lens optics 26.

In FIG. 2, an annular ridge 22b projects from an end of the barrel housing 22a of the rotatable barrel 22 by way of a spacer ring. An outer diameter of the annular ridge 22b is slightly greater than that of the barrel housing 22a. An outer surface of the annular ridge 22b contacts an inner surface of the stationary barrel 13. A gap is created between the inner surface of the stationary barrel 13 and the outer surface of the barrel housing 22a. Also, an annular ridge 13c projects from the inner surface of the stationary barrel 13 by way of a spacer ring similar to the annular ridge 22b. The annular ridge 13c contacts an outer surface of a rear end of the barrel housing 22a.

When the aperture ring 16 of the lens barrel assembly 12 of this construction is rotated, the pin device 38 moves along the ring groove 15a and the first and second grooves 13a and 37, and pushes an edge of the engaging groove 36a in the diaphragm control plate portion 36, which is moved rotationally in the rotatable barrel 22. As the diaphragm control plate portion 36 is shorter than that according to a conventional lens barrel, the diaphragm control plate portion 36 can rotate the driving ring 32d without shake. The aperture opening 34 can be set at a size according to a rotational shift of the aperture ring 16.

Figure 7:
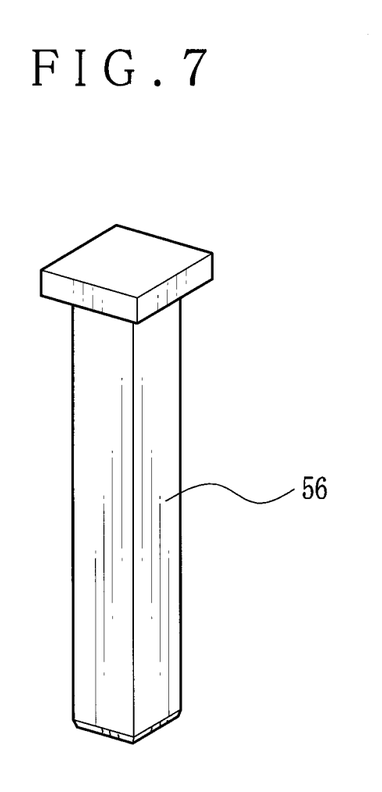
FIG. 7 is a perspective view illustrating another preferred pin device with a quadrilateral cross section.

In the above embodiment, the pin device 38 is cylindrical. However, a polygonal cross-section pin device 56 or quadrilateral cross-section pin device of FIG. 7 can be used instead. As the pin device 56 will not rotate in the engaging groove 36a of the diaphragm control plate portion 36, torque for rotating the aperture ring 16 can be used efficiently to exert force to move the diaphragm control plate portion 36 in the circumferential direction of the stationary barrel 13.

Figure 8:
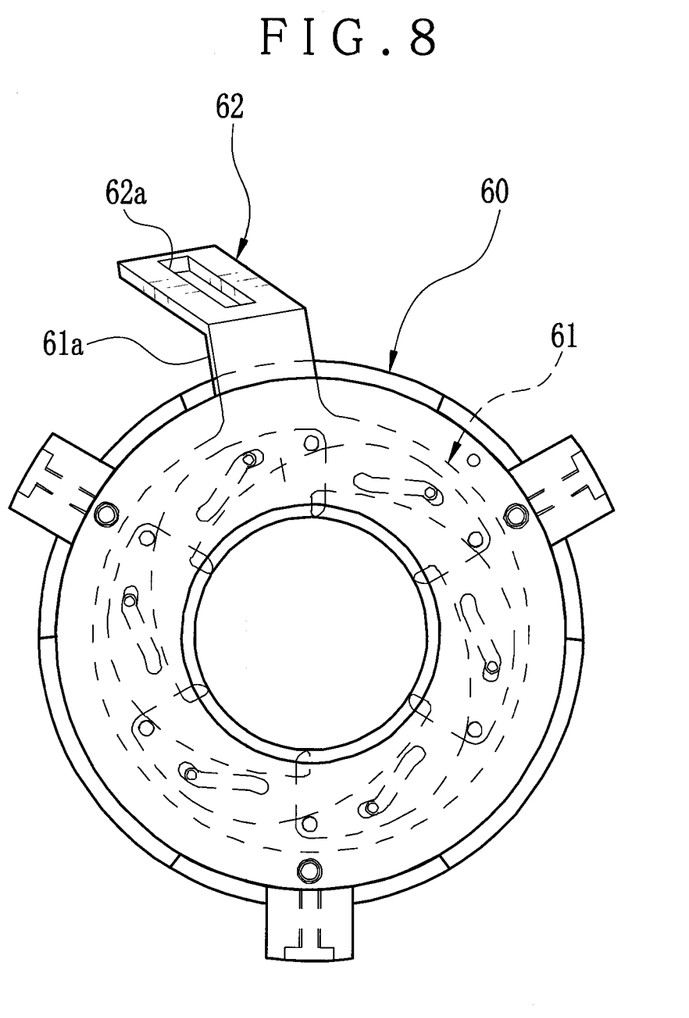
FIG. 8 is a perspective view illustrating another preferred iris diaphragm device.

In the above embodiment, the diaphragm control plate portion 36 is originally separate from the iris diaphragm device 32 and secured to the end portion 35a of the projecting lug 35 with the screw. In contrast, another preferred iris diaphragm device 60 is illustrated in FIG. 8. A diaphragm control plate portion 62 is incorporated in the iris diaphragm device 60. A driving ring 61 as a driving portion is formed with the diaphragm control plate portion 62 as one piece. A projecting lug 61a of the diaphragm control plate portion 62 extends at a right angle from the iris diaphragm device 60. An engaging groove 62a is formed in the iris diaphragm device 60 similarly to the engaging groove 36a. Thus, the structure of the single piece including the driving ring 61 and the diaphragm control plate portion 62 is effective for reducing the number of assembled parts and the number of steps of assembling the iris diaphragm device 60.

In the above embodiment, the aperture ring 16 is rotated manually. However, a motor can be used. Gear teeth can be formed with the aperture ring 16, and rotated by the motor to rotate the aperture ring 16.

In the above embodiment, the lens barrel assembly is used for the image projector or video projector. However, a lens barrel assembly of the invention may be used for a camera or other optical instruments.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens barrel assembly including a stationary barrel, a rotatable barrel for rotating in said stationary barrel relative thereto, to move an incorporated lens system along an optical axis, and an iris diaphragm device, contained in said rotatable barrel, for changing a size of an aperture opening by rotating a driving portion rotatable about said optical axis, said lens barrel assembly comprising:
    a first groove, formed in said stationary barrel to extend in a circumferential direction defined about said optical axis, and having a length equal to or more than a rotatable range of said rotatable barrel;
    a second groove, formed in said rotatable barrel to extend along said first groove, and having a length according to a combination of said rotatable range of said rotatable barrel and a rotatable range of said driving portion;
    a diaphragm control plate portion, disposed in said rotatable barrel in a rotatable manner in said circumferential direction, having an end portion from which said driving portion extends;
    an engaging groove formed in said diaphragm control plate portion to extend along said optical axis;
    an operable unit disposed outside said stationary barrel in a rotatable manner about said optical axis; and
    a pin device, having first and second end portions, said first end portion being secured fixedly to said operable unit, said second end portion being inserted through said first and second grooves and said engaging groove, for operating upon rotation of said operable unit to cause said engaging groove to rotate said diaphragm control plate portion about said optical axis to actuate said iris diaphragm device with said driving portion.

2. A lens barrel assembly as defined in claim 1, wherein said length of said second groove is equal to or more than a sum of said rotatable range of said rotatable barrel and said rotatable range of said driving portion.

3. A lens barrel assembly as defined in claim 1, wherein said first groove is constituted by at least first and second insertion grooves formed in respectively positions defined by equally dividing a circumference of said stationary barrel in said circumferential direction, and said first insertion groove receives insertion of said pin device;
    further comprising:
    a second operable unit, disposed outside said stationary barrel, for rotating said rotatable barrel; and
    a transmission portion, inserted in said second insertion groove, for transmitting force from said second operable unit to said rotatable barrel.

4. A lens barrel assembly as defined in claim 1, wherein said pin device is a quadrilateral cross-section pin device.

5. A lens barrel assembly as defined in claim 1, wherein said diaphragm control plate portion is formed together with said driving portion.

6. A lens barrel assembly as defined in claim 1, further comprising a retaining portion for securing said end portion of said diaphragm control plate portion to said driving portion.

7. A lens barrel assembly as defined in claim 1, wherein said lens system is for use with a projector.

8. A lens barrel assembly as defined in claim 1, further comprising:
    a lens holder, contained in said rotatable barrel, for supporting said lens system; and
    a cam mechanism for moving said lens holder along said optical axis when said rotatable barrel is rotated.

9. A lens barrel assembly as defined in claim 8, wherein said iris diaphragm device further includes a plurality of diaphragm blades, moved pivotally when said driving portion is rotated, for enlarging and reducing said aperture opening.

10. A lens barrel assembly as defined in claim 8, wherein said lens system includes at least first, second and third lens optics arranged on said optical axis serially;
    said iris diaphragm device is associated with a lens holder of said second lens optics.

11. A projector for projecting an image, including a stationary barrel, a rotatable barrel for rotating in said stationary barrel relative thereto, to move an incorporated lens system along an optical axis, and an iris diaphragm device, contained in said rotatable barrel, for changing a size of an aperture opening by rotating a driving portion rotatable about said optical axis, said projector comprising:
    a first groove, formed in said stationary barrel to extend in a circumferential direction defined about said optical axis, and having a length equal to or more than a rotatable range of said rotatable barrel;
    a second groove, formed in said rotatable barrel to extend along said first groove, and having a length according to a combination of said rotatable range of said rotatable barrel and a rotatable range of said driving portion;
    a diaphragm control plate portion, disposed in said rotatable barrel in a rotatable manner in said circumferential direction, having an end portion from which said driving portion extends;
    an engaging groove formed in said diaphragm control plate portion to extend along said optical axis;
    an operable unit disposed outside said stationary barrel in a rotatable manner about said optical axis; and
    a pin device, having first and second end portions, said first end portion being secured fixedly to said operable unit, said second end portion being inserted through said first and second grooves and said engaging groove, for operating upon rotation of said operable unit to cause said engaging groove to rotate said diaphragm control plate portion about said optical axis to actuate said iris diaphragm device with said driving portion.

12. A projector as defined in claim 11, wherein said length of said second groove is equal to or more than a sum of said rotatable range of said rotatable barrel and said rotatable range of said driving portion.

13. A projector as defined in claim 11, wherein said diaphragm control plate portion is formed together with said driving portion.

14. A projector as defined in claim 11, further comprising a retaining portion for securing said end portion of said diaphragm control plate portion to said driving portion.

* * * * *